United States Patent [19]

Ohzeki et al.

[11] Patent Number: 4,539,012
[45] Date of Patent: Sep. 3, 1985

[54] PITCH-CONTAINING COMPOSITION

[75] Inventors: Osamu Ohzeki, Fukui; Katsuhiko Shimakawa, Sabae; Zenichi Mashino, Soka, all of Japan

[73] Assignees: Nikka Chemical Industry Co., Ltd.; Chiyoda Chemical Enginrng & Constrct. Co. Ltd., both of Kanagawa, Japan

[21] Appl. No.: 592,066

[22] Filed: Mar. 22, 1984

[30] Foreign Application Priority Data

Mar. 24, 1983 [JP] Japan ................................ 58-49512

[51] Int. Cl.³ .............................................. C10L 1/32
[52] U.S. Cl. .......................................... 44/51; 44/61
[58] Field of Search ................................. 44/51, 61, 6

[56] References Cited

U.S. PATENT DOCUMENTS

| 4,104,035 | 8/1978 | Cole et al. | 44/51 |
| 4,217,109 | 8/1980 | Siwersson et al. | 44/51 |
| 4,302,212 | 11/1981 | Yamamura et al. | 44/51 |
| 4,358,293 | 11/1982 | Mark | 44/51 |
| 4,441,887 | 4/1984 | Funk | 44/51 |

FOREIGN PATENT DOCUMENTS

| 1770 of 1865 | United Kingdom | 44/61 |
| 261907 12/1926 | United Kingdom | 44/61 |

Primary Examiner—Y. Harris-Smith
Attorney, Agent, or Firm—Pahl, Lorusso & Loud

[57] ABSTRACT

A composition in the form of a dispersion or a slurry, which comprises an aqueous medium, a finely divided pitch, and a specific dispersant of an amount sufficient for maintaining the pitch in the dispersed state. The dispersant is selected from (A) a compound of the formula shown below, (B) a polymeric material obtained by crosslinking the compound (A) with a crosslinking agent, (C) a salt of the sulfuric ester of the compound (A) and (D) a salt of the sulfuric ester of the polymeric material (B). The compound (A) is expressed as follows:

$$Z-(Y-X)_p$$

wherein Z is an organic radical capable of forming, together with p number of hydrogen atom, an active hydrogen-containing organic compound of the formula $Z-(H)_p$ where H is the active hydrogen and p is a positive integer; Y is a polyoxyalkylene group consisting essentially of a plurality of monomer units, the monomer unit being at least one member selected from an ethylene oxide monomer unit ($-CH_2-CH_2-O-$) and a propylene oxide monomer unit ($-CH_2-CHCH_3-O-$); X is a hydrogen atom; and p has the same meaning as above. The composition is suitable as a fuel.

21 Claims, No Drawings

PITCH-CONTAINING COMPOSITION

BACKGROUND OF THE INVENTION

This invention relates generally to a pitch-containing composition. More specifically, the present invention is directed to an aqueous composition in the form of a slurry or dispersion containing a finely divided pitch dispersed in water.

As a result of the decrease of high quality petroleum crude oils in recent years, a need was increased for converting heavy, poor quality hydrocarbon oils into light hydrocarbon oils. Thus, a variety of petroleum refining plants have been constructed for the conversion of heavy oils into light oils by a solvent deasphaltene method, a thermal cracking method, a catalytic cracking method or the like method. These processes unavoidably yield, as a by-product, pitch formed of extremely heavy hydrocarbon components. Since pitch has generally a lower content of ash and a higher heating value than coal, an attempt has been made for the utilization of pitch as a fuel for various combustion installations. However, unlike liquid petroleum, pitch is a solid at room temperature and, therefore, requires relatively high costs such as for transportation and storage. Further, since pitch in the molten state fails to exhibit a desired fluidity, it is not possible to use it as a fuel for combustion in a furnace wherein the fuel is streamed through pipes and sprayed from a burner nozzle.

SUMMARY OF THE INVENTION

It is, therefore, an object of the present invention to provide a pitch-containing composition useful as a fuel.

Another object of the present invention is to provide a composition in the form of a slurry or dispersion having excellent stability and fluidity for a long period of time.

It is a special object of the present invention to provide a composition of the above-mentioned type which can be sprayed, for combustion, from the conventional burner nozzles.

In accomplishing the foregoing objects, there is provided in accordance with the present invention a composition in the form of a dispersion, which comprises an aqueous medium, a finely divided pitch, and a specific dispersant of an amount sufficient for maintaining the pitch in the dispersed state. The dispersant is selected from (A) a compound of the formula shown below, (B) a polymeric material obtained by crosslinking the compound (A) with a crosslinking agent, (C) a salt of the sulfuric ester of the compound (A) and (D) a salt of the sulfuric ester of the polymeric material (B). The compound (A) is expressed as follows:

$$Z—(Y—X)_p$$

wherein Z is an organic radical capable of forming, together with p number of hydrogen atom, an active hydrogen-containing organic compound of the formula $Z—(H)_p$ where H is the active hydrogen and p is a positive integer; Y is a polyoxyalkylene group consisting essentially of a plurality of monomer units, the monomer unit being at least one member selected from methylene oxide monomer unit ($—CH_2—CH_2—O—$) and a propylene oxide monomer unit ($—CH_2—CHCH_3—O—$); X is a hydrogen atom; and p has the same meaning as above. The crosslinking agent is preferably selected from the group consisting of aldehydes and polyfunctional compounds having at least two functional groups selected from isocyanate, epoxy, carboxylic acid and carboxylic acid anhydride.

Other objects, features and advantages of the present invention will become apparent from the following detailed description of the invention to follow.

DETAILED DESCRIPTION OF THE INVENTION

Any pitches, both natural and synthetic, may be used for the purpose of the present invention. Pitches derived from coal or petroleum are preferred raw materials for the preparation of the composition of this invention. Illustrative of suitable petroleum pitches are those obtained, as extraction residues, by deasphalting treatment of heavy hydrocarbon oils, such as vacuum residues, with a solvent such as propane or butane; those separated, as residues, from products of thermal cracking treatment of heavy hydrocarbon oils; those separated, as residues, from products of catalytic cracking treatment of petroleum fractions; and those separated, as residues, from products of the heat treatment of heavy hydrocarbon oils with superheated steam. Illustrative of suitable coal pitches are coal tar pitch and vacuum bottoms of liquified coal. Treated or modified pitches obtained by thermally treating and/or hydrogenating the above petroleum-derived or coal-derived pitches may also be used for the purpose of the present invention. It is preferable to use pitches having a softening point of at least 50° C.

It is important that the pitch should be fined divided. Preferably the pitch has an average particle size of between 40 and 70 μm. It is also preferred that at least 70 weight %, more preferably at least 80 weight % of the pitch have a particle size of not coarser than 200 mesh. The content of the pitch in the composition is preferably between 50 and 85 weight %, more preferably between 70 and 80 weight %. Too low a content of the pitch is unsuitable because the resulting composition fails to have a sufficient heating value. Too high a concentration of the pitch is also undesirable because it becomes difficult to maintain the composition in a suitably dispersed state.

The composition of the present invention is comprised of the above-described, finely divided pitch dispersed in an aqueous medium, and a specific dispersant which serves to maintain the pitch in a dispersed or slurried state. The dispersant is at least one member selected from (A) a polyalkylene group-containing compound, (B) a polymeric material obtained by crosslinking the compound (A) with a crosslinking agent, (C) a salt of the sulfuric ester of compound (A) and (D) a salt of the sulfuric ester of the polymeric material (B).

The compound (A) is represented by the following general formula:

$$Z—(Y—X)_p$$

wherein
Z is an organic radical capable of forming, together with p number of hydrogen atom, an active hydrogen-containing organic compound of the formula $Z—(H)_p$ where H is the active hydrogen and p is a positive integer,
Y is a polyoxyalkylene group consisting essentially of a plurality of monomer units, said monomer unit being at least one member selected from —CH$_2$—CH$_2$—O— and —CH$_2$—CHCH$_3$—O—,
X is a hydrogen atom, and
p has the same meaning as above. In the case of compound (A) in which p is 2 or more, it is not necessary that the substituents —Y—X are the same with each other.

Thus, the compound (A) is a polyaddition product obtained by reacting an active hydrogen-containing compound with an alkylene oxide. Preferably, the active hydrogen-containing compound Z—(H)$_p$ is a compound of the formula:

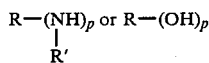

where R and R', independently with each other, are hydrogen or organic radicals and p has the same meaning as that described above.

Illustrative of suitable compounds of the formula

are methylamine, ethylamine, propylamine, ammonia, ethylenediamine, hexamethylenediamine, diethyltriamine and triethylenetetramine.

Illustrative of suitable compounds of the formula R—(OH)$_p$ are methanol, ethanol, isopropyl alcohol, butyl alcohol, octyl alcohol, oleyl alcohol, stearyl alcohol, ethylene glycol, propylene glycol, butylene glycol, glycerin, trimethylol propane, triethanolamine, diglycerin, pentaerythritol, sorbitan, sorbitol, phenol, cresol, an alkylphenol, an alkylphenol-formaldehyde condensation product and a phenol-formaldehyde condensation product.

When both propylene oxide and ethylene oxide are used for the reaction with the active hydrogen-containing compound, i.e. when the polyoxyalkylene group Y is composed of both propylene oxide and ethylene oxide monomer units, it is preferred that they are reacted to form a block copolymer chain rather than a random copolymer chain. It is also preferred that the monomers positioning at terminal end-side of the compound (A) be ethylene oxide monomers.

It is preferred that the polyoxyalkylene group Y of the compound (A) contain ethylene oxide monomer units and the total content of the ethylene oxide monomer units be in the range of between 40 and 98%, more preferably between 60 and 80%, based on the molecular weight of the compound (A). The molecular weight of the compound (A) is preferably between 1,000 and 100,000, more preferably between 5,000 and 50,000.

Compound (C) is a compound of the above general formula in which X is —OSO$_3$M where M is a cation capable of forming, together with a OSO$_3$ anion, a salt. The compound (C) may be prepared by reacting the corresponding proton-type compound (A) with an esterification agent capable of forming a sulfuric ester, such as sulfuric acid, fuming sulfuric acid, chlorosulfonic acid or sulfamic acid, to form the ester and, then, neutralizing the ester with a neutralizing agent such as an organic or inorganic base. Illustrative of suitable neutralizing agents are sodium hydroxide, potassium hydroxide, ammonia, methylamine and ethanolamine.

The polymeric material (B) which serves as the dispersant according to the present invention is obtained by crosslinking the compound (A) with a crosslinking agent. Preferably, the crosslinking agent is selected from aldehydes and polyfunctional compounds having at least two functional groups selected from isocyanate, epoxy, carboxylic acid and carboxylic acid anhydride. Examples of suitable crosslinking agent include hyxamethylene diisocyanate, tolylene diisocyanate, metaxylene diisocyanate, 4,4'-diphenylmethane diisocyanate, naphthylene diisocyanate, isophorone diisocyanate, ethylene glycol diglycidyl ether, propylene glycol diglycidyl ether, Bisphenol A diglycidyl ether, Bisphenol S diglycidyl ether, maleic acid, maleic anhydride, fumaric acid, formaldehyde and glyoxal.

The crosslinking may be performed by any conventional method, for example, by reacting the compound (A) with the crosslinking agent at a temperature of between 30° and 130° C. with stirring in the optional presence of the customarily employed acid or base catalyst. The amount of the crosslinking agent used for the reaction is preferably between 0.05 and 5 equivalents per one equivalent of the hydroxyl or sulfuric acid ester group of the polyalkylene group, i.e. between 0.05×p and 5×p (where p has the same meaning as above) moles per mole of the compound (A). It is preferred that the crosslinking be conducted so that between 10 and 90 mol % of the compound (A) is crosslinked.

The relationship between the compounds (B) and (D) is the same as that between the compounds (A) and (C). Thus, the compound (D) may be prepared by reacting the compound (B) in the same manner as that in the preparation of the compound (C) from the compound (A).

The polymeric materials (B) and (D) exhibit superior dispersing effect in comparison with the compounds (A) and (C) and the use of the polymeric material (B) or (D) as the dispersant is preferred. The amount of the dispersant in the pitch-containing composition of the present invention varies according to the amount and kind of the pitch and the kind of the dispersant. Preferably, the dispersant is used in an amount of between 0.1 and 2 parts by weight, more preferably between 0.2 and 1 parts by weight per 100 parts by weight of the pitch.

The composition of the present invention may be prepared in various manners. For example, pitch is first ground into particles by means of a hammer mill, to which is added an aqueous medium containing a dispersant dissolved or dispersed therein. The mixture is then subjected to a further pulverizing operation by means of a ball mill, roll mill, sand mill, colloid mill or high speed shearing-type homogenizer for finely pulverizing the pitch particles.

The composition of the present invention is characterized by its dispersion-stability during storage. That is, the dispersed state of the composition is maintained for a long period of time. Further, the composition has a low viscosity and exhibits a good fluidity. Therefore, the composition is able to be passed through pipes and pumps and sprayed from a spray nozzle without difficulty. In addition, the temperature at which the gelation of the dispersed pitch particles contained in the composition occurs is high. This is advantageous since coagulation or precipitation of the pitch particles may result from the gelation. Thus, the composition of the present invention possesses all the properties required for use as a fuel for combustion burners. Because of the presence of water in the composition of the present invention, the generation of NO$_x$ and soot is low upon combustion thereof. The composition of the present invention may also be suitably used as a raw material for the gasification of pitch.

The composition of the present invention may contain an additive or additives. The incorporation of a phosphoric acid salt and/or a water-soluble polymeric substance into the pitch-containing composition is preferred because the homogenety of the dispersion is improved without adversely affecting the other properties such as fluidity and high gelation temperature.

Examples of such a phosphoric acid salt include pyrophosphates, hexametaphosphates, tripolyphosphates and polymetaphosphates. Examples of the water-soluble polymeric substance include a polyethylene oxide, a polyvinyl alcohol, a polyacrylamide, a methyl cellulose, a carboxymethyl cellulose, hydroxyethyl cellulose, hydroxypropyl cellulose, hydroxypropylmethyl cellulose, a guar gum a hydroxypropyl guar gum and a carboxymethylhydroxypropyl guar gum. It is a preferred that the water-soluble polymeric substance have a molecular weight of at least 1,000. The content of the phosphoric acid salt is preferably in the range of between 0.01 and 0.5 parts by weight, more preferably between 0.03 and 0.1 parts by weight per 100 parts by weight of the pitch. The content of the water-soluble polymeric substance is in the range of between 0.001 and 0.5 parts by weight, more preferably between 0.005 and 0.1 parts by weight per 100 parts by weight of the pitch.

The following examples will further illustrate the present invention. In the Examples, "part" is on weight basis. The viscosity was measured at 25° C. using B-type viscosimeter (Manufactured by Tokyo Keiki Co., Ltd., Roter: No. 3, Revolutional speed: 60 r.p.m.). The stability of the disperse phase was determined in the following manner:

Sample composition contained in a 100 ml glass cylinder was allowed to stand in a quiescent condition at 25° C. After 1, 7 and 30 days, the dispersion state of the sample was observed and the rigidity of the precipitate, if any, was measured.

The stability of disperse phase was rated on the basis of the following evaluation.

| Evaluation | Characterizing feature |
| --- | --- |
| A (excellent stability) | No precipitation |
| B (Good stability) | Slightly precipitated. Precipitation is very soft. Easily homogeneously dispersed again by agitation. |
| C (poor stability) | About half of the pitch is precipitated. The precipitate is hard. |
| D (Very poor stability) | Almost all the pitch is precipitated. The precipitate is very hard. |

EXAMPLE 1

Pitch having a melting point of 180° C., a volatile matter content of 41.1 weight % and an ash content of 0.1 weight % and being obtained, as a residue, by distillation of a product obtained by thermally cracking a vacuum residue was pulverized by means of a hammer mill operated at a rotational speed of 2,300 r.p.m. to obtain a pulverized pitch, 23% of which was able to pass through a sieve of 200 mesh. 70 parts of the pulverized pitch and 30 parts of an aqueous solution containing 0.28 parts of a dispersant and the balance of water were mixed by means of a kneader and then ground by means of a ball mill, operated at a rotational speed of 60 r.p.m., for 20 min to obtain a pitch-in-water slurry. The dispersant is a block copolymer of propylene oxide and ethylene oxide having a molecular weight of 13,330. The contents of propylene oxide monomer units and ethylene oxide monomer units (hereinafter referred to as "PO content" and "EO content, respectively) in the copolymer were 4,000 and 9,330, respectively in terms of molecular weight. The dispersant is a compound obtained by reacting propylene glycol, as an active hydrogen-containing compound, with propylene oxide and ethylene oxide. About 80% of the pitch in the slurry was able to pass through a sieve of 200 mesh. The viscosity of the slurry was found to be 450 centi-poises. The slurry was a homogeneous dispersion and was found to show excellent stability (evaluation A) when tested after 24 hours. The slurry was found to be suited as a fuel to be sprayed from a burner nozzle.

EXAMPLE 2

Example 1 was repeated in the same manner as described except that a block copolymer of propylene oxide and ethylene oxide having a molecular weight of 12,000, a PO content of 3,000 and an EO content of 9,000 was used as the dispersant, thereby obtaining a slurry having a viscosity of 600 centi-poises and a particle size distribution similar to the slurry of Example 1. The slurry exhibited an excellent stability after 24 hours.

EXAMPLES 3–7

Example 1 was repeated in the same manner as described using various different dispersants. The propylene glycol, which was the active hydrogen-containing compound, of the dispersant of Example 1 was thus replaced with glycerin (Example 3), sorbitol (Example 4), ethylenediamine (Examples 5 and 6) or a condensation product of nonylphenol and formaldehyde having four benzene rings (Example 7). The molecular weight and the PO and EO contents of these dispersants were as shown in Table 1. All of the resulting slurry had an excellent stability similar to that of Example 1. The viscosity of each slurry is also shown in Table 1.

TABLE 1

| | Dispersant | | | | |
| --- | --- | --- | --- | --- | --- |
| Example | Active hydrogen-containing compound | PO content | EO content | Molecular weight | Viscosity (centi-poises) |
| 1 | Propylene glycol | 4000 | 9330 | 13330 | 450 |
| 2 | Propylene glycol | 3000 | 9000 | 12000 | 600 |
| 3 | Glycerin | 3000 | 8912 | 12000 | 560 |
| 4 | Sorbitol | 4808 | 20000 | 25000 | 540 |
| 5 | Ethylenediamine | 4290 | 10150 | 14500 | 300 |
| 6 | Ethylenediamine | 5580 | 13020 | 18600 | 350 |
| 7 | Nonylphenol-formaldehyde | 9800 | 39000 | 49722 | 400 |

EXAMPLES 8–16

Example 1 was repeated in the same manner as described except that the block copolymer used in Example 1 was substituted with ammonium salt of the sulfuric acid ester of the dispersant of Example 1 (Example 8), sodium salt of the sulfuric acid ester of the dispersant of Example 2 (Example 9), ethanolamine salt of the sulfuric acid ester of the dispersant of Example 3 (Example 10), potassium salt of the sulfuric acid ester of the dispersant of Example 4 (Example 11), ammonium salt of the sulfuric acid ester of the dispersant of Example 5 (Example 12), ammonium salt of the sulfuric acid ester of the dispersant of Example 6 (Example 13), ammonium salt of the sulfuric acid ester of the dispersant of Example 7 (Example 14), 1:1 mixture of the dispersant of Example 1 and a copolymer of maleic anhydride and acrylic acid (Example 15), and a 1:1 mixture of the dispersant of Example 2 and Tween 81 (polyoxyethylene sorbitan ether sesquioleate) (Example 16). The slurried compositions thus obtained in Examples 8–16 had viscosity of 250, 500, 450, 350, 380, 300, 400, 360 and 450 centipoises and showed dispersion stability similar to that of Example 1.

COMPARATIVE EXAMPLES 1–5

Example 1 was repeated in the same manner as described except that sodium oleate (Comparative Example 1), sodium alkylbenzene sulfonate (Comparative Example 2), sodium lignin sulfonate (Comparative Example 3), sodium salt of a condensation product of naphthalene sulfonic acid and formaldehyde (Comparative Example 4) and sodium salt of a copolymer of maleic anhydride and acrylic acid (Comparative Example 5) were each used in place of the copolymer dispersant of Example 1. The resulting compositions failed to form a slurry or dispersion.

EXAMPLES 17–24

Ground pitch was mixed with an aqueous solution containing a dispersant and the mixture was pulverized to obtain a pitch-in-water slurry. The kind of the pitch, the formulation of the mixture, pulverizing apparatus used and rotational speed of the pulverizing apparatus were as indicated in Table 2. In Table 2, pitch A is a pitch obtained by solvent deasphaltening treatment of a vacuum residue and has a melting point of 139° C., a volatile matter content of 52.4% and an ash content of 0.27%. The pitch B is obtained as a residue from a product of thermal cracking of a vacuum residue and has a melting point of 181° C., a volatile matter content of 41.1% and an ash content of 0.1%. The particle size of the pitch A and B is shown in Table 3. The dispersant used in these Examples was a block copolymer (molecular weight of 15,500) obtained by addition polymerization of ethylene oxide to a propylene glycol having a molecular weight of 3000. Thus, the dispersant had a EO content of 12,500. The viscosity of each of the thus obtained slurry was shown in Table 2. Each slurry had an excellent stability similar to that of Example 1.

TABLE 3

|  | Ground Pitch | |
| --- | --- | --- |
|  | Pitch A | Pitch B |
| 20 mesh or coarser | 1.2 | 7.4 |
| 20–100 mesh | 44.0 | 43.8 |
| 100–145 mesh | 11.6 | 8.9 |
| 145–200 mesh | 9.3 | 16.7 |
| 200–250 mesh | 9.3 | 19.7 |
| 250 mesh or finer | 25.3 | 24.1 |

EXAMPLES 25–32

Example 1 was repeated in the same manner as described except various crosslinked polymeric materials were used each in place of the copolymer dispersant of Example 1. The resulting slurries had about 75–85% of the pitch particles capable of passing through a sieve of 200 mesh. The active hydrogen-containing compound, PO content, EO content, molecular weight of the polyether (compound (A)) prior to the crosslinking, crosslinking agent, amount of crosslinking agent (in terms of ratio by equivalent of crosslinking agent to polyether), degree of crosslinking, viscosity of the resulting slurry, stability of the slurry and temperature at which gelation of the slurry occurred in each Example are summarized in Table 4. The active hydrogen-containing compounds of Examples 25–30 were the same as those of Examples 1–6, respectively. The active hydrogen-containing compounds of Examples 31 and 32 were a condensation product of nonylphenol and formaldehyde having three benzene rings, and a condensation product of phenol and formaldehyde having four benzene rings, respectively.

EXAMPLES 33–40

Examples 25–32 were repeated in the same manner as described except that the crosslinked dispersant of Examples 25–32 were replaced with salts of their respective corresponding sulfuric acid esters. The properties of the resulting slurries were as shown in Table 4.

EXAMPLES 41–43

Examples 25, 27 and 30 were each repeated in the same manner as described except that non-crosslinked polyethers used in Example 25, 27 and 30 were each used in place of the corresponding crosslinked product. The results are shown in Table 4. In Table 4 (and in Table 5 as well), the abbreviations HDI, TDI, XDI, DPDI, IPDI and FA mean hexamethylene diisocyanate, tolylene diisocyanate, xylylene diisocyanate, diphenylmethane diisocyanate, isophorone diisocyanate and formaldehyde, respectively.

TABLE 2

| | | Formulation (parts) | | | | | |
| --- | --- | --- | --- | --- | --- | --- | --- |
| Example | Pitch | Pitch | Water | Dispersant | Pulverizing apparatus | Rotational speed | Viscosity |
| 17 | A | 70 | 30 | 0.7 | Colloid mill | 50 m/sec | 550 |
| 18 | A | 70 | 30 | 0.3 | Colloid mill | 50 m/sec | 620 |
| 19 | A | 70 | 30 | 0.7 | Sand mill | 2000 rpm | 100 |
| 20 | A | 70 | 30 | 0.7 | Ball mill | 60 rpm | 400 |
| 21 | B | 70 | 30 | 0.3 | Ball mill | 60 rpm | 920 |
| 22 | B | 75 | 25 | 0.75 | Colloid mill | 50 m/sec | 300 |
| 23 | B | 70 | 30 | 0.7 | Roll mill | 100 rpm | 400 |
| 24 | B | 75 | 25 | 0.3 | Sand mill | 2000 rpm | 150 |

TABLE 4

| Example No. | Dispersant Active hydrogen-containing compound | PO content | EO content | Molecular weight | Cross-linking agent | Amount of cross-linking agent | Degree of cross-linking (%) | Viscosity (cp) | Stability After 1 day | After 7 days | After 30 days | Gelation temperature (°C.) |
|---|---|---|---|---|---|---|---|---|---|---|---|---|
| 25 | *1 | 4000 | 9330 | 13330 | HDI | 0.5 | 58 | 320 | A | A | B | 73 |
| 26 | *1 | 1750 | 6600 | 8350 | TDI | 0.5 | 47 | 480 | A | A | B | 70 |
| 27 | *2 | 3000 | 8912 | 12000 | XDI | 0.3 | 35 | 400 | A | A | B | 68 |
| 28 | *3 | 4808 | 20000 | 25000 | DPDI | 0.7 | 26 | 210 | A | A | B | 69 |
| 29 | *4 | 2690 | 9250 | 12000 | TDI | 0.5 | 61 | 280 | A | A | B | 75 |
| 30 | *4 | 4690 | 9750 | 14500 | HDI | 0.4 | 55 | 310 | A | A | B | 73 |
| 31 | *5 | 0 | 10560 | 10805 | TDI | 0.5 | 45 | 530 | A | A | B | 71 |
| 32 | *6 | 3586 | 16000 | 20000 | FA | 0.6 | 53 | 440 | A | A | B | 74 |
| 33 | Ammonium salt of the sulfuric ester of dispersant of Example 25 | | | | | | | 380 | A | A | B | 75 |
| 34 | Sodium salt of the sulfuric ester of dispersant of Example 26 | | | | | | | 460 | A | A | B | 72 |
| 35 | Ethanolamine salt of the sulfuric ester of dispersant of Example 27 | | | | | | | 320 | A | A | B | 70 |
| 36 | Potassium salt of the sulfuric ester of dispersant of Example 28 | | | | | | | 180 | A | A | B | 71 |
| 37 | Ammonium salt of the sulfuric ester of dispersant of Example 29 | | | | | | | 180 | A | A | B | 83 |
| 38 | Ammonium salt of the sulfuric ester of dispersant of Example 30 | | | | | | | 310 | A | A | B | 79 |
| 39 | Ammonium salt of the sulfuric ester of dispersant of Example 31 | | | | | | | 440 | A | A | B | 76 |
| 40 | Ammonium salt of the sulfuric ester of dispersant of Example 32 | | | | | | | 370 | A | A | B | 81 |
| 41 | *1 | 4000 | 9330 | 13330 | Non-crosslinked | | | 450 | A | C | D | 58 |
| 42 | *2 | 3000 | 8912 | 12000 | Non-crosslinked | | | 560 | A | C | D | 53 |
| 43 | *4 | 4690 | 9750 | 14500 | Non-crosslinked | | | 350 | A | B | C | 59 |

*1 Propylene glycol,
*2 Glycerin,
*3 Sorbitol,
*4 Ethylenediamine,
*5 Nonylphenol-formaldehyde,
*6 Phenol-formaldehyde

EXAMPLES 44-54

TABLE 5

| Example No. | Crosslinking agent | Amount of crosslinking agent | Degree of crosslinking (%) | Viscosity (cp) | Stability After 1 day | After 7 days | After 30 days | Gelation temperature (°C.) |
|---|---|---|---|---|---|---|---|---|
| 44 | TDI*[1] | 0.5 | 50 | 250 | A | A | B | 75 |
| 45 | HDI*[1] | 0.5 | 47 | 270 | A | A | B | 71 |
| 46 | IPDI*[1] | 0.5 | 40 | 200 | A | A | B | 76 |
| 47 | Bisphenol A diglycidyl ether | 0.3 | 36 | 260 | A | A | B | 70 |
| 48 | Bisphenol S diglycidyl ether | 0.3 | 37 | 250 | A | A | B | 70 |
| 49 | Ethylene glycol diglycidyl ether | 0.7 | 40 | 270 | A | A | B | 69 |
| 50 | Polyethylene glycol (n = 9) diglycidyl ether | 0.7 | 28 | 270 | A | A | B | 68 |
| 51 | Propylene glycol diglycidyl ether | 0.7 | 40 | 290 | A | A | B | 69 |
| 52 | Neopentyl glycol diglycidyl ether | 0.7 | 29 | 270 | A | A | B | 66 |
| 53 | FA*[1] | 0.5 | 50 | 350 | A | A | B | 73 |
| 54 | Glyoxal | 0.5 | 35 | 400 | A | A | B | 72 |

*[1]See Example 41-43 above 75 parts of the pitch A used in Example 17 and 25 parts of an aqueous solution containing 0.35 parts of a dispersant was mixed with each other and the mixture pulverized by means of a high speed shearing-type homogenizer (manufactured by Kika-Werk Janke & Kunkel KG, Germany) at a rotational speed of 10,000 r.p.m. to obtain a slurry. The slurry had about 80-85% of pitch passing through a sieve of 200 mesh. The dispersant used in each Example was a salt of the sulfuric acid ester of a crosslinked product obtained by crosslinking, with a crosslinking agent shown in Table 5, a polymeric compound similar to that of Example 30. The polymeric compound was a product obtained by addition-polymerizing propylene oxide to ethylene diamine to yield a polymeric material having a molecular weight of 4,000. The addition polymerization of the thus obtained polymeric material with ethylene oxide gave the desired polymeric compound having a molecular weight of 22,000. Thus, the polymeric compound had an EO content of 18,000. The amount of the crosslinking agent, degree of crosslinking, viscosity of the slurry, stability of the slurry and temperature at which the gelation of the slurry occurred in each Example are shown in Table 5.

EXAMPLES 55-63

Example 44 was repeated in the same manner as described except that 0.07 parts of an additive were additionally used in conjunction with the crosslinked dispersant. The additive used and the properties of the resulting slurry are summarized in Table 6.

COMPARATIVE EXAMPLES 6-9

Example 44 was repeated in the same manner as described except that the crosslinked dispersant was replaced with a mixture of sodium salt of a copolymer of maleic anhydride and acrylic acid and a sodium salt of hexametaphosphate (Comparative Example 6), a mixture of a sodium salt of a copolymer of maleic anhydride and acrylic acid and hydroxypropylmethyl cellulose (Comparative Example 7), a mixture of sodium salt of a condensation product of sodium naphthalene sulfonate and formaldehyde and potassium salt of polymetaphosphate (Comparative Example 8) and a mixture of sodium salt of a condensation product of sodium naphthalene sulfonate and formaldehyde and carboxymethyl cellulose (Comparative Example 9). The resulting compositions failed to form a slurry or dispersion.

product and a phenol-formaldehyde condensation product.

TABLE 6

| Example No. | Additive | Viscosity (cp) | Stability After 1 day | Stability After 7 days | Stability After 30 days | Gelation temperature (°C.) |
|---|---|---|---|---|---|---|
| 55 | Potassium tripolyphosphate | 200 | A | A | A | 75 |
| 56 | Potassium polymetaphosphate | 140 | A | A | A | 74 |
| 57 | Sodium hexametaphosphate | 350 | A | A | A | 80 |
| 58 | Hydroxypropylmethyl cellulose | 460 | A | A | A | 79 |
| 59 | Polyethylene oxide (MW 5 × $10^5$) | 530 | A | A | A | 84 |
| 60 | Carboxymethyl cellulose | 470 | A | A | A | 83 |
| 61 | Hydroxypropyl guar gum | 400 | A | A | A | 72 |
| 62 | Hydroxyethyl cellulose | 600 | A | A | A | 81 |
| 63 | none | 250 | A | A | B | 75 |

We claim:

1. A composition in the form of a slurry which is stable at 25° C. for at least 24 hours, comprising
an aqueous medium;
a finely divided solid petroleum pitch; and
a dispersant in an amount sufficient for maintaining said pitch in the dispersed state, said dispersant being at least one member selected from the group consisting of (A) a compound having the following general formula:

$$Z-(Y-X)_p$$

wherein
Z is an organic radical capable of forming, together with p number of hydrogen atom, an active hydrogen-containing organic compound of the formula $Z-(H)_p$ where H is the active hydrogen and p is a positive integer,
Y is a polyoxyalkylene group consisting essentially of a plurality of monomer units, said monomer unit being at least one member selected from $-CH_2-CH_2-O-$ and $-CH_2-CHCH_3-O-$,
X is a hydrogen atom, and
p has the same meaning as above, (B) polymeric material obtained by crosslinking the compound (A) with a crosslinking agent, (C) a salt of the sulfuric ester of the compound (A) and (D) a salt of the sulfuric ester of the polymeric material (B).

2. A composition as claimed in claim 1, wherein said active hydrogen-containing compound is selected from those of the formula:

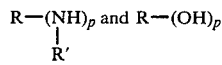

wherein R and R', independently with each other, are organic radicals and p has the same meaning as above.

3. A composition as claimed in claim 2, wherein said active hydrogen-containing compound is a member selected from the group consisting of methanol, ethanol, isopropyl alcohol, butyl alcohol, octyl alcohol, oleyl alcohol, stearyl alcohol, ethylene glycol, propylene glycol, butylene glycol, glycerin, trimethylol propane, triethanolamine, diglycerin, pentaerythritol, sorbitan, sorbitol, methylamine, ethylamine, propylamine, ammonia, ethylenediamine, hexamethylenediamine, diethyltriamine, triethylenetetramine, phenol, cresol, an alkylphenol an alkylphenol-formaldehyde condensation product and a phenol-formaldehyde condensation product.

4. A composition as claimed in claim 1, wherein the compound (A) has a molecular weight of between 1000 and 100,000.

5. A composition as claimed in claim 4, wherein the polyalkylene group Y of the compound (A) contains ethylene oxide monomer units and the total content of the ethylene oxide monomer units is in the range of between 40 and 98% based on the molecular weight of the compound (A).

6. A composition as claimed in claim 3, wherein said active hydrogen-containing compound is a condensation product of formaldehyde and nonylphenol or octylphenol.

7. A composition as claimed in claim 1, wherein at least 70 weight % of the pitch has a particle size of not coarser than 200 mesh.

8. A composition as claimed in claim 1, wherein the content of said pitch is between 50 and 85 weight %.

9. A composition as claimed in claim 1, wherein the content of said dispersant is in the range of between 0.1 and 2 parts by weight per 100 parts by weight of said pitch.

10. A composition as claimed in claim 1, wherein said salt is an alkali metal salt, ammonium salt or an amine salt.

11. A composition as claimed in claim 1, wherein said crosslinking agent is selected from the group consisting of aldehydes and polyfunctional compounds having at least two functional groups selected from isocyanate, epoxy, carboxylic acid and carboxylic acid anhydride.

12. A composition as claimed in claim 11, wherein said crosslinking agent is a member selected from the group consisting of hyxamethylene diisocyanate, tolylene diisocyanate, metaxylene diisocyanate, 4,4'-diphenylmethane diisocyanate, naphthylene diisocyanate, isophorone diisocyanate, ethylene glycol diglycidyl ether, polyethylene glycol diglycidyl ether propylene glycol diglycidyl ether, neopentyl glycol diglycidyl ether Bisphenol A diglycidyl ether, Bisphenol S diglycidyl ether, maleic acid, maleic anhydride, fumaric acid, formaldehyde and glyoxal.

13. A composition as claimed in claim 1, further comprising a phosphoric acid salt.

14. A composition as claimed in claim 13, wherein the phosphoric acid salt is selected from pyrophosphates, hexametaphosphates, tripolyphosphates and polymetaphosphates.

15. A composition as claimed in claim 13, wherein the content of the phosphoric acid salt is in the range of between 0.01 and 0.5 parts by weight per 100 parts by weight of the pitch.

16. A composition as claimed in claim 1, further comprising a water-soluble polymeric substance.

17. A composition as claimed in claim 16, wherein said water-soluble polymeric substance is selected from a polyethylene oxide, a polyvinyl alcohol, a polyacrylamide, a methyl cellulose, a carboxymethyl cellulose, hydroxyethyl cellulose, hydroxypropyl cellulose, hydroxypropylmethyl cellulose, a guar gum a hydroxypropyl guar gum and a carboxymethylhydroxypropyl guar gum.

18. A composition as claimed in claim 16, wherein the content of the water-soluble polymeric substance is in the range of between 0.001 and 0.5 parts by weight per 100 parts by weight of the pitch.

19. A composition as claimed in claim 1, wherein the content of the pitch is between 70 and 80 weight %.

20. A composition as claimed in claim 1, wherein the pitch has an average particle size of between 40 and 70 µm.

21. The composition of claim 1 wherein said pitch has a softening point of at least 50° C.

* * * * *